United States Patent Office 3,059,163
Patented Oct. 16, 1962

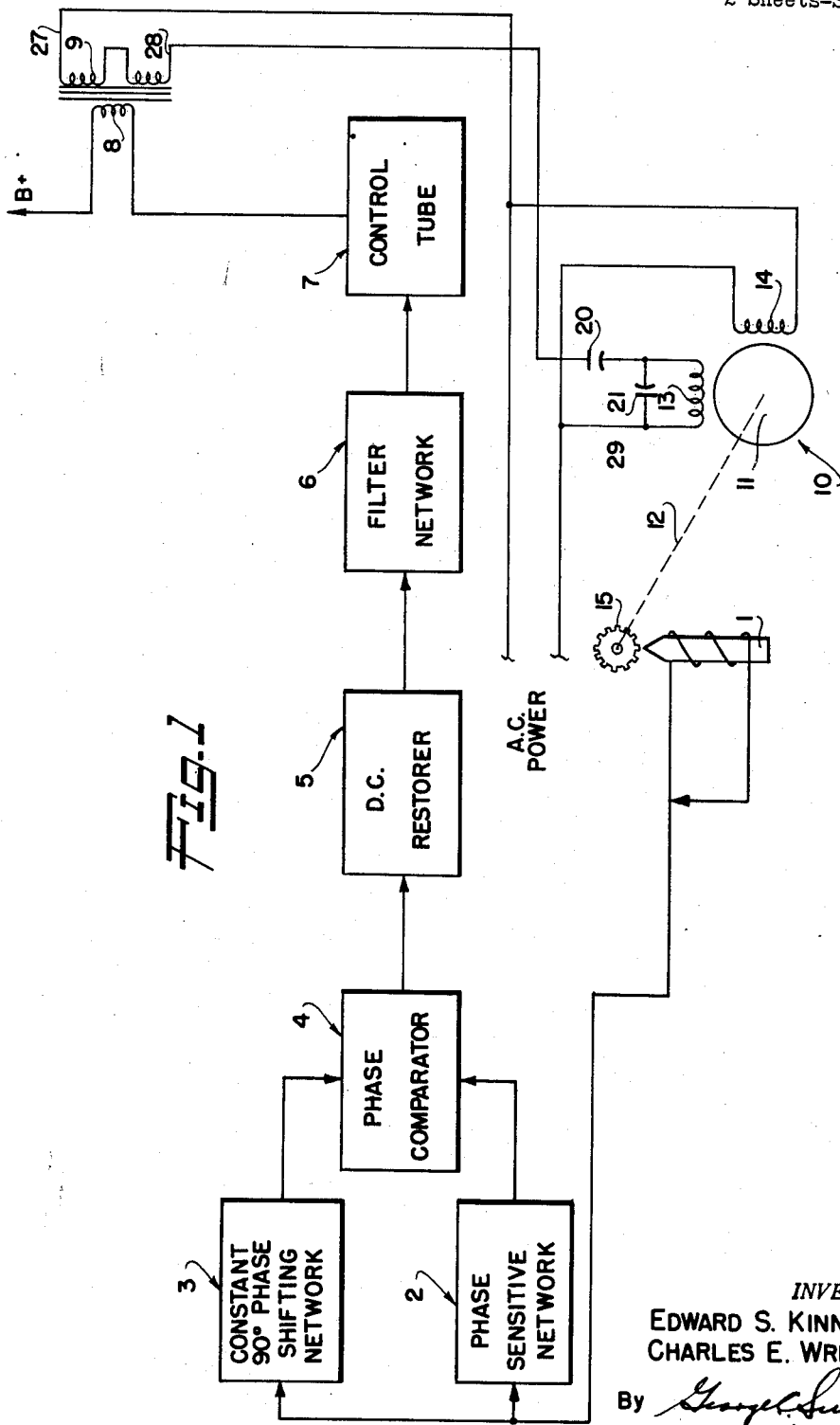

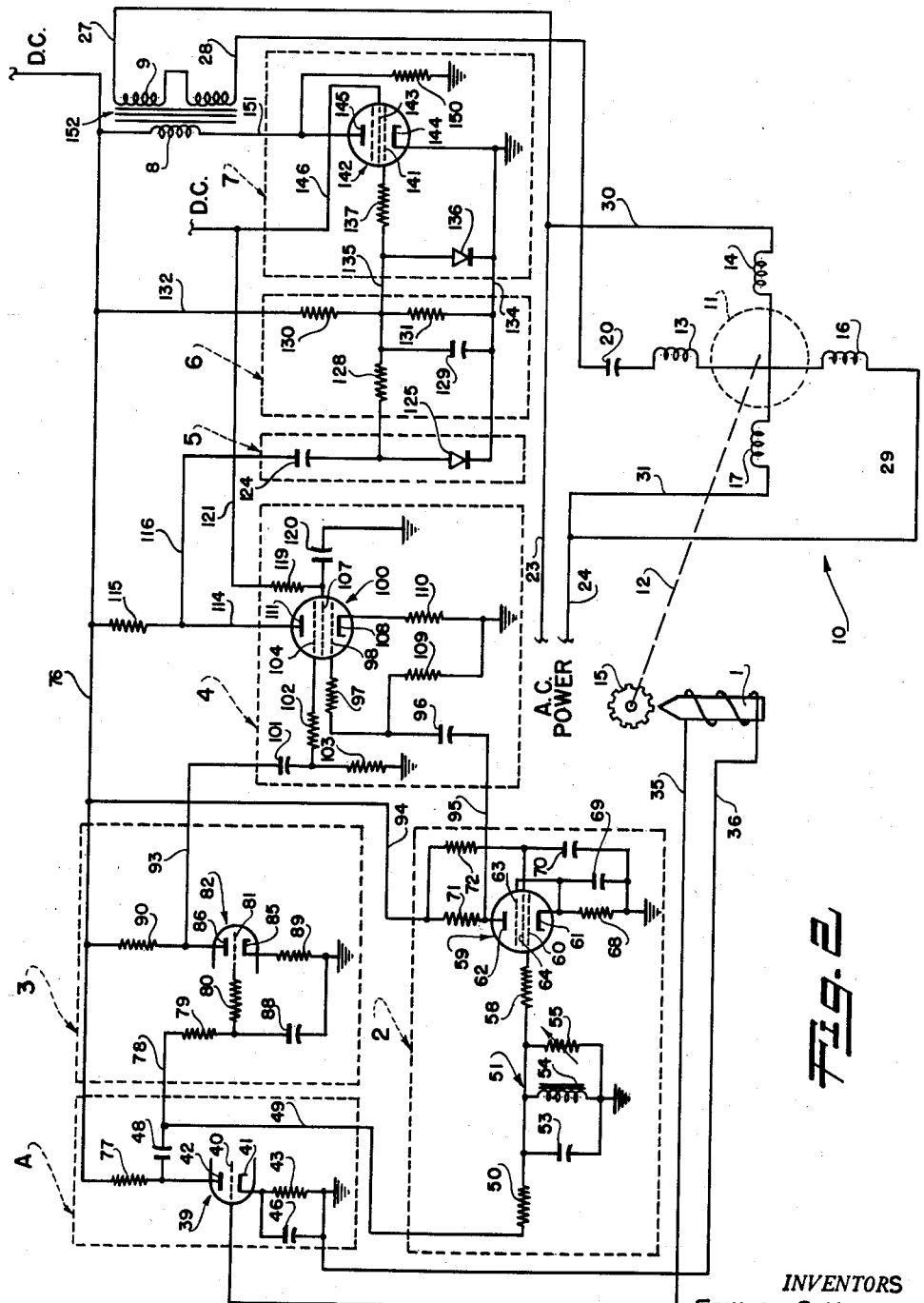

3,059,163
MOTOR CONTROL
Edward S. Kinney, Studio City, and Charles E. Wright, Van Nuys, Calif., assignors to Lockheed Aircraft Corporation, Burbank, Calif.
Filed Dec. 23, 1959, Ser. No. 861,484
5 Claims. (Cl. 318—229)

The present invention relates to a device to control the speed of an electric motor. More particularly, it relates to a device to control the speed of an alternating current induction servo motor. Even more particularly, it pertains to means to provide a constant speed control means for an alternating current induction servo motor.

Many systems driven by an electric motor have critical speed requirements. Either changes in the speed must be delicately adjusted or a constant speed must be maintained within close limits. Examples of devices which require delicate speed control are those which record or reproduce sound such as tape recorders or disc record players. Sound is comprised of audible frequency. The frequency of the power source which drives the motor transporting the sound storage means must be constant. Constant speed is necessary to faithfully record or reproduce the original pitch. Deviations in drive frequency will produce an undesirable deviation in the sound frequency or pitch.

In the art of telemetering there is also required constant speed control in order that the multiple sampling channels be coordinated and synchronized with readout means. Other applications of constant speed control will be apparent to those who have been faced with the problems.

Where an extremely accurate alternating current source is available, the speed of the motor may be directly controlled within broad tolerance limits by the frequency of the alternating current. This has been adequate in some instances. However, recent developments have increased the requirements for accurate motor speed control. Even the closest control of the A.C. power has not been found accurate enough.

Where the frequency of the alternating current power source cannot be held to close tolerances, the problem of control of motor speed is magnified. The source of alternating current in an aircraft, for example, may vary from 380 to 420 cycles. Where only a fluctuating current power source is available, some means are necessary to insure critical control of motor speed.

With the extreme difficulty of controlling direct current voltage which is the controlling factor in the speed of a direct current motor, direct current motor systems for most delicate requirements have been all but entirely abandoned. Therefore, alternating current is the only means to provide constant speed for motors.

Some systems have utilized pulleys and belts for speed control. Inherent problems in this system are pulley friction and belt stretch. The starting and stopping time is appreciable. When the time from start to full speed must be very short as well as stopping time, a transmission involving pulleys and belts cannot be considered.

It is an important object of the present invention to provide a device which will insure a constant speed of rotation of a motor in such a manner that deviations in main power source frequency will not affect its speed of rotation. Changes in the frequency of the alternating current main power source will be met with a phase change of alternate windings of the motor to counteract the resultant tendency to change speed so as to maintain the speed constant.

It is another important object of the present invention to provide a system of motor speed control which utilizes a minimum number of elements. This permits light weight, simple mechanisms. Little space is required. Simplicity results in minimized maintenance. A small package is advantageous.

It is another important object of the present invention to provide a positive control means to increase or decrease speed. A variable inductor is utilized in a resonant tuned circuit in series with the power source so as to vary its phase as applied to selected motor windings. When applied to alternate windings of the motors, the phase angle with the remaining windings driven directly from the main power source may be varied. The rotor will vary its speed directly with increase or decrease in phase angle relationships. Thus, positive decrease as well as increase is provided.

It is another important object of the present invention to provide a motor speed control system in which short term variations in speed due to torque angle variation are reduced. Means are provided so that any deviation from the desired speed is immediately sensed in change in frequency and the error corrected without appreciable time delay.

It is another important object of the present invention to provide a speed control system for an A.C. induction servo motor which permits the device being driven by the motor to be attached directly to the motor shaft, thus eliminating the need for a complicated system of pulleys and belts or like transmission means for speed control and thus eliminate the inherent inaccuracies and inefficiencies of such a system.

Additional advantages and features will become apparent from the reading of the specification which follows, especially when taken in conjunction with the appended drawings in which like numerals equal like elements.

FIG. 1 is a block diagram showing the motor speed control circuitry wherein constant speed is required.

FIG. 2 is a circuit diagram of those circuits shown in FIG. 1.

The system, according to the present invention, utilizes means which generate an alternating voltage having a frequency proportional to the speed of the motor being controlled. The motor under control in the example given herein is of the alternating current induction servo type which includes four stator windings 90 degrees from each other about the rotor. The speed of rotation of the rotor will equal the speed of phase relationship of the windings. The alternating current generated in direct relation to the rotation of the motor is conducted to a network which is resonant with the frequency of the current generated by the motor when it is at its desired speed of rotation. The phase of the resultant signal from this network will be lagging when the speed of rotation of the motor is above that desired and leading if below.

This is compared with the actual frequency being generated. The amount of lead or lag in relation to the actual frequency is converted to a proportionate direct current voltage and finally applied to a control winding of a variable inductor. The variable inductor is a part of a network resonant with the frequency of the main A.C. power source and is in series with alternate windings of the induction motor. Thus, by altering the induction of the variable inductor, the phase relationship of the main alternating current power source may be varied thus varying the phase angle between adjacent windings of the induction motor thereby varying the speed. The further apart the phase angle of the frequency of the power in adjacent windings (up to 90 degrees), the faster the rotational speed of the motor. Likewise, the closer the difference in phase angle, the less the speed. In this manner, the direction of rotation of the rotor may also be varied since the motor will rotate toward the winding which lags in phase.

FIG. 1 shows a circuit in block form utilizing the present invention in the form of a loop network. Rotation of the alternating current induction type motor whose rotor is represented by numeral 11 drives the serrated disc 15 through the motor shaft 12 shown in dotted lines. Rotation of the disc 15 will generate a signal in the magnetic transducer 1 having a frequency directly proportional to the speed of the motor. This frequency is applied to the Phase Sensitive Network 2 and to the Constant Phase Shift Network 3 after being amplified by voltage amplifier A.

The Phase Sensitive Network 2 causes the signal generated by the transducer 1 to shift in phase with an increase or decrease in motor speed. The Phase Sensitive Network 2 may be a parallel inductive capacitive resonant tuned circuit. At resonance, this circuit will cause no phase shift in the signal from the transducer 1. When the motor speed increases, the signal voltage across the tuned circuit of the Phase Sensitive Network 2 will be phase lagging compared to the signal from the transducer 1. Likewise, when the motor decreases in speed, the signal voltage across the tuned circuit of the Phase Sensitive Network 2 will be phase leading when compared to the transducer signal. Therefore, the output phase is proportional to motor speed.

The Phase Comparator 4 compares the signal from the Phase Sensitive Network 2 and the signal from the transducer 1. The Phase Comparator 4 may be a gated beam tube. In order for the Phase Comparator 4 to determine if the motor is above or below the correct speed, the transducer signal voltage applied to the Phase Comparator 4 must be delayed by 90 degrees. The Phase Shifting Network 3 may be a resistive capacity integration circuit to cause a voltage lag of the transducer signal by 90 degrees over the necessary frequency range. This fixed phase signal is applied to one controlling element of the tube of Phase Comparator 4 while the varying phase signal proportional to the motor speed from the Phase Sensitive Network 2 is applied to the other controlling element. When the motor is running at the correct speed, there will be a 90 degree phase difference between the signals from Network 2 and Network 3. The resultant output of the Phase Comparator 4 will be a pulse with a repetition rate of the transducer signal and a 25% duty cycle. If the motor speed decreases, the duty cycle will decrease proportionally and likewise an increase in speed will cause an increase in the duty cycle. The output of the Phase Comparator 4 is coupled to a D.C. Restorer 5 and filtered by the Network 6. The resultant D.C. error signal is applied to a Control Tube 7 which controls the D.C. current through a control winding 8. The inductance of the winding 9 is therefore inversely proportional to the error signal magnitude.

It can be seen that the variable inductance winding 9 and the capacitor 20 form a series tuned circuit. The current phase relationship between the winding 13 and the winding 14 is therefore a direct function of the inductance of winding 9. In an alternating current induction motor, the direction and speed of rotation are a direct function of the phase relationships of the current in adjacent motor windings. Two only are shown in FIG. 1 for simplicity of explanation. With an average D.C. current through the control winding 8, the capacitor 20 is resonant with the inductance 9 at the A.C. power source frequency. Thus the error signal will cause the resonant point of the series tuned circuit to vary above and below the A.C. power frequency. This causes the current in motor winding 13 to vary in phase relationship as compared to the winding 14. The rotor 11 is thereby caused to accelerate or decelerate as a function of the error signal.

Thus, it can be seen that when the rotor 11 is rotating at speeds greater than that desired, a lesser D.C. current will be conducted through the control winding 8 delaying the phase relationship of the main A.C. power source which will slow the rotor 11 to the correct speed. Likewise, slowing of speed below that desired will cause an increased current to the control winding 8 resulting in a lower inductance in the winding 9 with resultant advance of the phase angle in the winding 13 so that the rotor 11 will increase its speed back to that desired.

The circuit shown in FIG. 2 is an expansion of FIG. 1. The motor 10 is shown with four field windings 13, 14, 16 and 17. In FIG. 1 only the windings 13 and 14 were shown for simplicity of explanation. Rotation of disc 15 will cause an alternating voltage to be developed in the magnetic transducer 1. This frequency will be proportional to the speed of the rotation of rotor 11.

The voltage developed by the transducer 1 is applied to the grid of triode 39 through the lines 35 and 36. Triode 39 is a voltage amplifier and is shown here as one half of a twin triode. In that circuit, the resistor 43 is a cathode biasing resistor, the condenser 46 is a cathode by-pass condenser, resistor 77 is a plate load resistor and the condenser 48 is a D.C. blocking condenser. The current developed in the line between plate 42 of the triode 39 and resistor 77 will be a fluctuating direct current. It is desired to have an alternating current as a product, therefore, the D.C. blocking condenser 48 serves to convert the fluctuating direct current to an alternating current in the lines 49 and 78.

The alternating current in the line 49 is applied to the Phase Shift Network 3. The Phase Sensitive Network 2 will produce a voltage in relation to the alternating voltage from the transducer 1 which will vary from a −90 degrees to a +90 degrees in relation to transducer 1 voltage. It includes a network 51 which is a tuned circuit whose resonant frequency is set equal to that developed by transducer 1 when the motor is running at the correct speed. Thus, when the motor is on correct speed, there will be no phase shift in the signal. As the motor increases or decreases in speed, the phase of this signal will lag or lead the input signal. The theoretical maximum phase shift is 90 degrees either way or −90 degrees to a +90 degrees phase shift from the phase of the signal developed by transducer 1.

The resistor 50 acts as an isolation resistor to prevent loading of the triode 39 from the network 51. It is also to prevent the phase angle change of the network 51 from appearing in the line 49. The network 51 is comprised of a condenser 53, an inductor 54 and a resistor 55 in parallel. The condenser 53 and the inductor 54 are so chosen to be resonant with the frequency developed in the magnetic transducer 1 when the motor 10 is at its desired speed and direction. Alternate resonant networks may be placed in the circuit by appropriate switches so that different base speeds and directions may be selected. The resistor 55 of the network 51 is a variable resistor to adjust the loop gain of the motor control circuit. At resonance, the network 51 will cause no phase shift in the signal applied to it from line 49. As the speed of the motor increases, the network 51 will become inductive. Thus, the signal voltage across the network 51 will be phase lagging as compared to the signal from the line 49. Likewise, when the motor decreases in speed, the network 51 will become capacitive and the signal voltage across the network 51 will be phase leading as compared to the signal voltage of transducer 1.

The signal from network 51 is applied through the grid current limiting resistor 58 to the grid 60 of pentode 59. Pentode 59 functions as a limiter amplifier whose cathode is biased by resistor 68. Condenser 69 functions as a cathode by-pass while the screen grid by-pass condenser 70 and the screen grid voltage dropping resistor 72 stabilize the voltage on the screen grid 64. Resistor 71 is a plate load resistor from the main D.C. power source in line 76 through line 94. The voltage developed on plate 62 will be a square wave whose phase will vary proportional to the speed of the motor 10.

The Phase Shifting Network 3 causes a fixed 90 degree phase lag of the signal produced by the transducer 1. This circuit consists of resistor 79 and condenser 88 which causes a fixed phase lag of the signal applied to the grid 81 of triode 82 through the grid current limiting resistor 80. The values of the resistor 79 and the condenser 88 are chosen so as to cause a voltage lag of 90 degrees across condenser 88 for the range of frequencies produced in transducer 1 by the rotation of the disc 15. The triode 82 is a limiter amplifier which includes cathode bias resistor 89 for the cathode 85 and plate voltage resistor 90 for plate 86.

As was stated, the signal developed in line 95 as compared to that developed by the transducer 1 varies from a −90 degrees to a +90 degrees. The signal developed in line 93 from the plate 86 of the Phase Shift Network 3 is a fixed 90 degree lag as compare to the signal developed by the transducer 1. Therefore, the signal developed in the line 95 as compared to that in line 93 will vary from an inphase condition to 180 degrees out of phase. These two signals are now applied to the Phase Comparator 4. The varying phase signal of line 95 is applied through the D.C. blocking condenser 96, the grid current limiting resistor 97 to the controlling element 98 of the pentode 100. Resistor 109 is a grid return resistor.

The signal in line 93 is fed through D.C. blocking condenser 101, the grid current limiting resistor 102 to the second controlling grid 104. Resistor 103 is a grid return resistor. Resistor 111 is a cathode biasing resistor for cathode 108. Resistor 119 is a screen voltage dropping resistor for the screen 107. Condenser 120 is a screen by-pass condenser for grid 107. Resistor 115 is a plate load resistor for plate 111.

Both controlling elements 98 and 104 must be positive during the same time period or the pentode 100 will not conduct. Failure of either controlling element 98 or 104 to be positive will put tube in a cutoff or non-conducting condition. The voltage resulting on plate 111 will have a pulse repetition rate of the frequency of the voltage produced by transducer 1. The output of the voltage of plate 111 will be a pulse with a pulse repetition frequency of the transducer 1 signal and a duty cycle dependent upon the phase relationship of the signals at controlling grids 98 and 104. As the two controlling grids 98 and 104 approach an inphase condition, the resultant voltage on plate 111 will approach a symmetrical square wave. As the signals appearing on the controlling grids 98 and 104 approach the 180 degree out of phase condition, the voltage on plate 111 will be a very narrow negative going pulse. When the motor 10 is at its correct frequency, there will be no phase shift from Phase Sensitive Network 2. The 90 degree shift in the Phase Shift Network 3 results in a negative going pulse whose repetition frequency is that of transducer 1 with a 25% duty cycle on plate 111. Therefore, the signal appearing on plate 111 will vary in duty cycle proportional to the motor speed. The signal from plate 111 is fed through lines 114, 116 to the D.C. Restorer Network comprised of a clamping circuit including a condenser 124 and a diode 125. Therefore, the signal across diode 125 is negative in relation to ground.

Filter Network 6 serves to smooth the pulses from Restorer 5 to a steady D.C. signal. Resistor 128 is an isolation resistor to isolate filter condenser 129 from D.C. Restorer 5. Condenser 129 serves as an integrating device to average out the negative pulses from the D.C. Restorer Network 5. As the pulse varies in width, the voltage developed on condenser 129 varies. Resistor 130 and resistor 131 constitute a D.C. voltage divider. This voltage dividing network is designed to set the proper bias voltage applied to grid 141 of pentode 142 (Control Tube 7) through the resistor 137 so that the current from pentode 142 to the control winding 8 of variable inductor 152 will cause the proper inductance in winding 9 for the running speed of the motor. Diode 136 is necessary when the motor 10 is stopped to prevent grid 141 from going positive. It is seen that the negative voltage developed on the grid 141 is directly proportional to the frequency of the signal developed by transducer 1. Therefore, the negative voltage developed on the grid 141 is directly proportional to the rotational velocity of rotor 11 of motor 10. Therefore, the voltage on grid 141 controls the current through pentode 142 and the control winding 8 of the variable inductor 152. The larger the negative voltage, the less will be the current passed by pentode 142. The inductance of winding 9 of the variable inductor 152 is directly proportional to the D.C. current in the control winding 8. The inductance winding 9 is tuned with the condenser 20 to resonate with the frequency of the A.C. motor power source. By varying the D.C. current in the control winding 8, directly varying the inductance of winding 9, the resonant frequency of the series circuit including induction winding 9 and the capacitor 20 will vary above and below the frequency of the A.C. power source.

Maximum current in the control winding 8 will cause minimum inductance in the winding 9 of the variable inductor 152. Lowering of inductance will raise the resonant point of the series circuit above the frequency of the A.C. motor power source. The phase angle of the signal through windings 13 and 16 of motor 10 will advance with respect to that in the windings 14 and 17. The speed of motor 10 will thereby be increased. The greater the phase angle between the to windings of the induction servo type motor up to 90 degrees, the greater the speed of that motor.

The converse is also true. By increasing the inductance of winding 9, the resonant point of the series circuit including condenser 20 will be lowered. It can be lowered so far as to be below frequency of the main A.C. power source. This phase lag would cause rotor 11 to reverse itself in such an instance.

Thus the circuitry shown in FIG. 2 thus embodies a novel speed control feature for motors which is not restricted to maintenance of a constant speed. Separate control means may be provided to alter the current in winding 8 to vary the inductance of winding 9 resulting in a change in speed or direction of the motor 10.

A method and means of motor speed control has been disclosed which provides instantaneous and positive control of the rotational velocity of the motor over a wide range of speeds. The components of this system are relatively simple, obviating the error expected from complex mechanisms. Little space is required. No large power source is necessary as is the case in many servo motor systems, thus reducing the weight.

While the details of a constant speed system have been disclosed here, it is obvious that the scope of the present invention can be used in any number of places wherein finite motor control is desired. For instance, a relatively simple means to control the current through control winding 8 of the variable inductor 152 to alter the inductance in winding 9 thereby changing the resonant point of the series tuned circuit comprised of the winding 9 and condenser 20 which is in series with alternate windings of a variable inductance servo type motor would provide a wide range of speeds and dual directional control.

The invention is not intended to be limited to any particular arrangement of parts or any specific method of operation or any of the various details thereof even where specifically shown and described herein, as the same may be modified in various particulars or may be applied in many varied relations without departing from the spirit and scope of the claimed invention, practical constructions embodying certain details of the invention being illustrated and described but only for the purpose of complying with the requirements of the statutes for the disclosure of operative embodiments but without attempting to disclose all of the various forms and modifications in which the invention might be embodied.

Having thus revealed the details of my invention, I claim the following combinations and equivalents thereof to which I desire the protection of a United States Letters Patent.

What is claimed is:

1. A device to control the speed of a motor comprised of means to generate an alternating electric voltage having a frequency proportional to the speed of rotation of said motor, means to cause said rotational frequency to lag when said motor is in overspeed condition and lead when in underspeed condition, means to generate an alternating voltage which lags the frequency proportional to the speed of rotation of said motor by 90°, means to compare said last two named voltages, means to generate a direct current proportional to the time coincidence of the phase of said last two named voltages, means to apply said direct current to the control winding of a variable inductor having a secondary winding, said secondary winding and alternate windings of said motor being in series with a condenser, said secondary winding and said condenser forming a resonant circuit and having values so selected to be resonant with the frequency of an alternating current power source, said alternating current power source being coupled in series with said resonant circuit, other of said windings of said motor being parallel to said series circuit and in series with said power source, deviations in said direct current through said control winding resulting from deviations from the correct speed of said motor altering the point of resonance of said resonant circuit so as to advance or retard the phase of the alternating current power source voltage in said alternate windings of said motor so that differing phase relationships with adjacent windings will increase or decrease the speed of said motor.

2. Motor control means comprised of means responsive to the rotational velocity of said motor to generate an alternating voltage having a frequency proportional to the rotational velocity of said motor, phase shifting network means to vary the phase of said alternating voltage from 90 degrees behind to 90 degrees ahead of said alternating voltage in relation to motor over or under speed, phase shifting network means to delay the phase of said alternating voltage by 90 degrees so that the phase of the voltage from the phase sensitive network means will vary 180 degrees with respect to the voltage from the phase shifting network means, means to apply said alternating voltage to said phase sensitive network means and said phase shifting network means, electronic valve means having two controlling elements both of which must have a voltage applied before said electronic valve means will conduct, means to apply the voltage from said phase sensitive network means to one of said controlling elements and means to apply the voltage from said 90 degree phase shift network means to the other of said control elements so that both the voltage from said phase shifting network means and said phase sensitive network means must coincide in order that the electronic valve means conduct, means to produce a substantially steady voltage proportional to the current flowing through said electronic valve means, means to apply said voltage to the controlling element of a second electronic valve means, said second electronic valve means conducting a current proportional to said direct current, means to apply said current to a control winding of a variable inductor having a secondary winding, alternate motor windings of said motor and a capacitor in series with said secondary winding and a source of alternating power source, said secondary winding and said condenser comprising a resonant network whose point of resonance varies indirectly with the inductance in said secondary winding so that the motor windings in series with said secondary winding and said condenser will vary in their phase relationship with respect to the alternating power source when the speed of said motor varies from a desired constant.

3. A device to maintain the speed of a motor constant comprised of means to generate an alternating voltage having a frequency proportional to the rotational speed of said motor, means to apply said alternating voltage to a parallel inductive capacitive resonant circuit tuned to the resonance of the alternating current which will be developed by the rotation of the motor when it is at its correct speed so that it will generate a voltage which will be in phase when the motor is at its correct speed but which will lag in phase when the motor is overspeed proportional to the amount of overspeed and lead in phase when it is underspeed in proportion to the amount of underspeed, means to apply the alternating voltage generated by the rotation of said motor to a resistive capacity integration circuit which will delay the phase relationship of said alternating current developed by the rotation of said motor by 90 degrees, means to compare the time coincidence of the voltage from the inductive capacity resonant circuit with the voltage from the resistive capacity integration circuit, means to generate a pulsating direct current having pulses whose time duration is equal to the time duration of the coincidence of said signals from the parallel inductive capacity resonant tuned circuit and the resistive capacity integration circuit, filter means to smooth out said pulses to a substantially steady direct voltage, means to apply said substantially steady direct voltage to the control grid of a vacuum tube so as to govern the amount of current the vacuum tube will pass, means to apply the current from said vacuum tube to the control winding of a variable inductor, the secondary of said variable inductor having a condenser in series so chosen that when said motor is at its correct speed, said substantially direct voltage developed on the grid of said vacuum tube will pass a current to said control winding developing an inductance in the secondary winding of said variable inductor which in series with said condenser will be resonant with an alternating power source, said alternating power source being in series with said secondary winding and said condenser and alternate windings of said motor, other of said windings of said motor being in series with said alternating current power source so that the current from said vacuum tube passed through said control winding of said variable inductor will vary the inductance in said secondary winding to alter the resonant point of said tuned circuit to advance or retard the phase relation of said alternating current power source so as to vary the phase relationship between adjacent windings of said motor thereby increasing or decreasing the speed of said motor.

4. A device to control the speed of a motor comprised of means to generate an alternating electric voltage having a frequency proportional to the speed of rotation of said motor, means to cause said rotational frequency to lag when said motor is in overspeed condition and lead when in underspeed condition, means to generate an alternating voltage which lags the frequency proportional to the speed of rotation of said motor by 90°, means to compare the last two named voltages, means to generate a direct current proportional to the time coincidence of the phase of said last two named voltages, means to apply said direct current to the control winding of a variable inductor, means to connect the secondary of the variable inductor in series with a resonant circuit and alternate windings of said motor so as to vary the phase relationship of an A.C. power source with respect to other windings of said motor.

5. Control means for an alternating current which has a plurality of windings around its rotor, a condenser, a variable inductance and an alternating current power source in series with alternate of said windings, said condenser and said inductance forming a circuit resonant with the frequency of said alternating current power source, said alternating current power source connected in series to windings of said motor other than alternate windings, means to generate an alternating electric voltage having a frequency proportional to the speed of rotation of said motor, means to cause said rotational frequency to lag when said motor is in overspeed and lead when in underspeed condition, means to generate an alternating voltage which lags the frequency proportional to the speed of rotation of said motor by 90°, means to compare the last two named voltages, means to generate a direct current proportional to the time coincidence of said last two named voltages, means to apply said direct current to the control winding of said variable inductance so that by varying said inductance the phase of said alternating current power source may be advanced or retarded thus varying the phase relationship of the signal in adjacent windings of the motor with resultant change in speed of said motor.

References Cited in the file of this patent

UNITED STATES PATENTS

| | | |
|---|---|---|
| 2,276,644 | Blankenbuehler | Mar. 17, 1942 |
| 2,803,792 | Turner | Aug. 20, 1957 |
| 2,913,652 | Greenberg et al. | Nov. 17, 1959 |